US011120918B2

(12) United States Patent
Aleshin et al.

(10) Patent No.: US 11,120,918 B2
(45) Date of Patent: Sep. 14, 2021

(54) NUCLEAR FUEL ASSEMBLY DEBRIS FILTERING BOTTOM NOZZLE (71) Applicant: Westinghouse Electric Company LLC, Cranberry Township, PA (US)

(72) Inventors: Artem Aleshin, Columbia, SC (US); David S. Huegel, Blythewood, SC (US); William Cleary, Irmo, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 637 days.

(21) Appl. No.: 15/923,491

(22) Filed: Mar. 16, 2018

(65) Prior Publication Data
US 2018/0268949 A1 Sep. 20, 2018

Related U.S. Application Data (60) Provisional application No. 62/472,983, filed on Mar. 17, 2017.

(51) Int. Cl.
*G21C 3/32* (2006.01)
*G21C 19/307* (2006.01)
*G21C 3/33* (2006.01)

(52) U.S. Cl.
CPC ......... *G21C 3/3206* (2013.01); *G21C 3/3305* (2013.01); *G21C 19/307* (2013.01); *Y02E 30/30* (2013.01)

(58) Field of Classification Search
CPC ...... G21C 3/3206; G21C 3/3305; G21C 3/34; G21C 3/356; G21C 3/3563; G21C 3/33
USPC ...................................................... 376/313
See application file for complete search history.

(56) References Cited

U.S. PATENT DOCUMENTS

| 4,096,032 A | | 6/1978 | Mayers et al. |
| 4,781,884 A | * | 11/1988 | Anthony ............... G21C 3/3206 376/352 |
| 4,849,161 A | * | 7/1989 | Brown .................... G21C 3/34 376/439 |
| 4,900,507 A | | 2/1990 | Shallenberger et al. |
| 5,037,605 A | | 8/1991 | Riordan, III |
| 5,539,793 A | | 7/1996 | Johansson et al. |

(Continued)

FOREIGN PATENT DOCUMENTS

| EP | 0709855 A1 | 5/1996 |
| JP | H09101385 A | 4/1997 |

(Continued)

OTHER PUBLICATIONS

International Search Report and Written Opinion of the International Searching Authority for PCT/US2018/022920 dated Jul. 10, 2018 (Forms PCT/ISA/220, PCT/ISA/210 and PCT/ISA/237).

(Continued)

*Primary Examiner* — Jack W Keith
*Assistant Examiner* — Jinney Kil
(74) *Attorney, Agent, or Firm* — K&L Gates LLP (57) ABSTRACT

A base portion for use in a bottom nozzle of a fuel assembly in a nuclear reactor includes a top surface, a bottom surface, and a plurality of vertical wall portions arranged in a generally squared grid-like pattern which extend between the bottom surface and the top surface and which define a plurality of non-circular passages passing between the bottom surface and the top surface through the base portion.

16 Claims, 10 Drawing Sheets

(56) References Cited

U.S. PATENT DOCUMENTS

| | | | |
|---|---|---|---|
| 5,867,551 A * | 2/1999 | Toshihiko | G21C 3/3206 376/352 |
| 7,822,165 B2 | 10/2010 | Broach et al. | |
| 2008/0101528 A1 * | 5/2008 | Friedrich | G21C 5/06 376/439 |
| 2011/0216873 A1 * | 9/2011 | Evans | G21C 3/334 376/352 |
| 2011/0268240 A1 | 11/2011 | Huq | |
| 2016/0336080 A1 * | 11/2016 | Yu | G21C 3/3206 |

FOREIGN PATENT DOCUMENTS

| | | | | |
|---|---|---|---|---|
| JP | 2849099 B2 | | 1/1999 | |
| JP | 2005172748 A | * | 6/2005 | ........... G21C 3/3305 |
| KR | 1020100076465 A | | 7/2010 | |
| WO | 02058075 A1 | | 7/2002 | |
| WO | 2015/175041 A2 | | 11/2015 | |

OTHER PUBLICATIONS

Supplementary European Search Report for corresponding European Patent Application No. 18768164.8, dated Nov. 13, 2020.

\* cited by examiner

NUCLEAR FUEL ASSEMBLY DEBRIS FILTERING BOTTOM NOZZLE

CROSS-REFERENCE TO RELATED APPLICATIONS

This patent application claims the priority benefit under 35 U.S.C. § 119(e) of U.S. Provisional Application No. 62/472,983 filed on Mar. 17, 2017, the contents of which are herein incorporated by reference.

BACKGROUND

1. Field

The present invention relates generally to nuclear reactors and, more particularly, is concerned with a debris filtering bottom nozzle in a nuclear fuel assembly such as employed in a pressurized water reactor (PWR).

2. Related Art

During manufacture and subsequent installation and repair of components comprising a nuclear reactor coolant circulation system, diligent effort is made to assure removal of all debris from the reactor vessel and its associated systems which circulate coolant through it under various operating conditions. Although elaborate procedures are carried out to help assure debris removal, experience shows that in spite of the safeguards used to effect such removal, some small amount of debris, such as metal chips and metal particles still remain hidden in the systems. Most of the debris consists of metal turnings which were probably left in the primary system after steam generator repair or replacement or similar types of plant modifications during the refueling process. It is desirable to ensure that this type of debris does not make its way into the fuel region during plant operation.

In particular, fuel assembly damage due to debris trapped at the lowermost grids has been noted in several reactors in the past. Debris enters through the fuel assembly bottom nozzle flow holes from the coolant flow openings in the lower core support plate when the plant is started up. The debris tends to become lodged in the lowermost support grids of the fuel assembly within the spaces between the "egg-crate" shaped cell walls of the grid and the lower end portions of the fuel rod tubes. The damage consists of fuel rod tube perforations caused by fretting of debris in contact with the exterior of the fuel tube. Debris can also become entangled in the nozzle plate holes and the flowing coolant causes the debris to gyrate which tends to cut through the cladding of the fuel rods.

Several different approaches have been proposed and tried for carrying out removal of debris from nuclear reactors. Many of these approaches are discussed in U.S. Pat. No. 4,096,032 to Mayers et al. U.S. Pat. No. 4,900,507 to Shallenberger et al. illustrates another approach. While all of the approaches described in the cited patents operate reasonably well and generally achieve their objectives under the range of operating conditions for which they were designed, a need still exists for a fresh approach to the problem of debris filtering in nuclear reactors. The new approach must be compatible with the existing structure and operation of the components of the reactor, be effective throughout the operating cycle of the reactor, and at least provide overall benefits which outweigh the costs it adds to the reactor.

SUMMARY

Embodiments of the concept as described herein provide an improved debris capturing feature for a fuel assembly, such as used in a pressurized water reactor (PWR), while at the same time minimizing pressure drop when compared to existing bottom nozzle designs. Embodiments of the invention utilize unique debris capturing features which are also designed to streamline the flow passages thereby resulting in a reduced pressure loss coefficient. The design is especially effective at the higher flow rates associated with the conditions standard commercial PWR nuclear reactors see during normal operating conditions. Embodiments of the invention also provide a built-in feature for holding the bottom end of the fuel rods. In many existing fuel designs, this functionality is performed by a grid which is strategically placed just above the bottom nozzle for the purposes of capturing debris as well as holding the end of the fuel rods. In embodiments of the invention, the fixturing of the end of the fuel rod is incorporated into the bottom nozzle design via the use of flex springs thus negating the need for a grid located directly above the bottom nozzle. This integrated approach enhances the overall bottom nozzle and thus fuel assembly design.

In one embodiment, a base portion for use in a bottom nozzle of a fuel assembly in a nuclear reactor is provided. The base portion comprises: a top surface; a bottom surface; and a plurality of vertical wall portions arranged in a generally squared grid-like pattern which extend between the bottom surface and the top surface and define a plurality of non-circular passages passing between the bottom surface and the top surface through the base portion.

The base portion may further comprise: a plurality of thickened areas, each disposed at intersections of the vertical wall portions; and a plurality of flow holes, each disposed in a respective thickened area.

Each flow hole may comprise a tapered inlet at the bottom surface of the base portion and a tapered outlet at the top surface of the base portion.

The base portion may further comprise a plurality of spring members, each spring member extending upward from a top edge of a respective wall portion a height, wherein each spring member is structured to be engaged by two fuel rods of the fuel assembly.

Each spring member may include a first spring-like biasing portion which is structured to engage one of the two fuel rods and a second spring like biasing portion which is disposed opposite the first spring-like biasing portion and which is structured to engage a second one of the two fuel rods.

Each of the first spring-like biasing portion and the second spring-like biasing portion may be of generally arcuate shape.

The base portion may further comprise a plurality of debris filters which are each positioned on the base portion to generally span across a respective one of the plurality of passages.

Each debris filter may comprise a hollow pyramid or hollow cone-like structure formed from a lattice structure which is sized and configured to minimize resistance in regard to coolant flow through the lattice structure and which extends upward from the base portion.

When viewed from directly above the base portion or directly below the base portion the lattice structure of each debris filter may be arranged so as to form a squared grid-like pattern.

The base portion and the plurality of spring members may be formed as a unitary element.

The base portion and the plurality of debris filters may be formed as a unitary element.

The base portion, the plurality of debris filters, and the plurality of spring members may be formed as a unitary element.

In other embodiments, a bottom nozzle assembly for use in a fuel assembly in a nuclear reactor is provided. The bottom nozzle assembly comprising: a generally rectangular skirt portion; and a planar base portion as previously described coupled to the generally rectangular base portion.

In yet a further embodiment, a fuel assembly for use in a nuclear reactor is provided. The fuel assembly comprises: a bottom nozzle assembly as previously described; a top nozzle; a number of guide tubes which extend longitudinally between, and are coupled to, the bottom nozzle and the top nozzle; and an array of elongated fuel rods extending between the top nozzle and the bottom nozzle.

BRIEF DESCRIPTION OF THE DRAWINGS

A further understanding of the invention can be gained from the following description of the preferred embodiments when read in conjunction with the accompanying drawings in which.

DETAILED DESCRIPTION

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Figure 1:
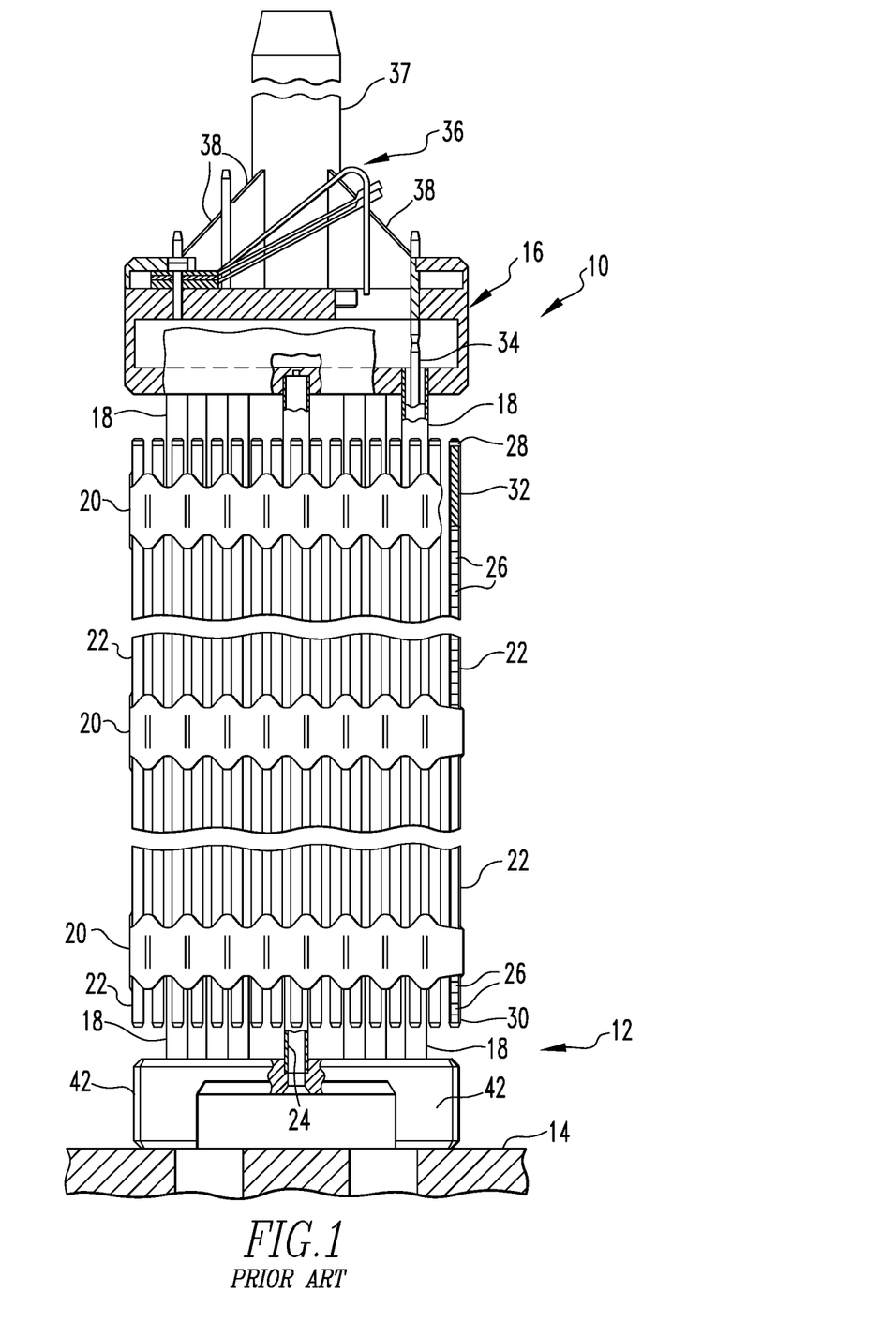
FIG. 1 is an elevational view, partly in section, of a conventional fuel assembly including a conventional debris filter bottom nozzle, the assembly being illustrated in vertically foreshortened form with parts broken away for clarity.

Referring now to the drawings, FIG. 1 shows an elevational view of a prior art fuel assembly, represented in vertically foreshortened form and being generally designated by the numeral 10, in which embodiments of the present invention may be employed. The fuel assembly 10 is the type used in a pressurized water reactor and has a structural skeleton which at its lower end includes a debris filter bottom nozzle 12 such as described in U.S. Pat. No. 4,900,507. The bottom nozzle 12 supports the fuel assembly 10 on a lower core support plate 14 in the core region of a reactor (not shown). In addition to the bottom nozzle 12, the structural skeleton of the fuel assembly 10 also includes a top nozzle 16 at its upper end and a number of guide tubes or thimbles 18 which extend longitudinally between the bottom and top nozzles 12,16 and at opposite ends are rigidly attached thereto.

The fuel assembly 10 further includes a plurality of transverse grids 20 axially spaced along and mounted to the guide thimbles 18 and an organized array of elongated fuel rods 22 transversely spaced and supported by the grids 20. Also, the assembly 10 has an instrumentation tube 24 located in the center thereof and extending between and mounted to the bottom and top nozzles 12,16. With such an arrangement of parts, the fuel assembly 10 forms an integral unit capable of being conveniently handled without damaging the assembly parts.

As mentioned above, the fuel rods 22 in the array thereof in the assembly 10 are held in spaced relationship with one another by the grids 20 spaced along the fuel assembly length. Each fuel rod 22 includes nuclear fuel pellets 26 and is closed at its opposite ends by upper and lower end plugs 28,30. The pellets 26 are maintained in a stack thereof by a plenum spring 32 disposed between the upper end plug 28 and the top of the pellet stack. The fuel pellets 26 composed of fissile material are responsible for creating the reactive power of the reactor. A liquid moderator/coolant such as water, or water containing boron, is pumped upwardly through a plurality of flow openings (not numbered) in the lower core plate 14 to the fuel assembly. The bottom nozzle 12 of the fuel assembly 10 passes the coolant flow along the fuel rods 22 of the assembly in order to extract heat generated therein for the production of useful work.

In order to control the fission process, a number of control rods 34 are reciprocally movable in the guide thimbles 18 located at predetermined positions in the fuel assembly 10. Specifically, a rod cluster control mechanism 36 positioned above the top nozzle 16 supports the control rods 34. The control mechanism has an internally threaded cylindrical member 37 with a plurality of radially extending flukes or arms 38. Each arm 38 is interconnected to a control rod 34 such that the control mechanism 36 is operable to move the control rods vertically in the guide thimbles 18 to thereby control the fission process in the fuel assembly 10, all in a well-known manner.

As mentioned above, fuel assembly damage due to debris trapped at or below the lowermost grids 20 has been found to be a problem. Therefore, to prevent occurrence of such damage, it is highly desirable to prevent such debris from passing through the bottom nozzle flow holes and reaching the fuel bundle region.

Figure 2:
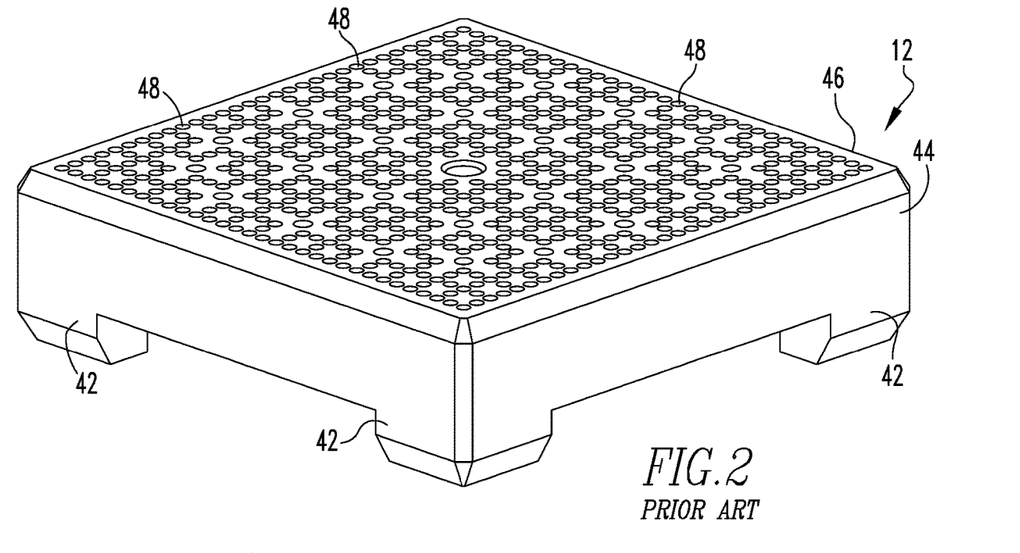
FIG. 2 is an isometric view of the conventional debris filter bottom nozzle of the fuel assembly of FIG. 1.
Figure 3:
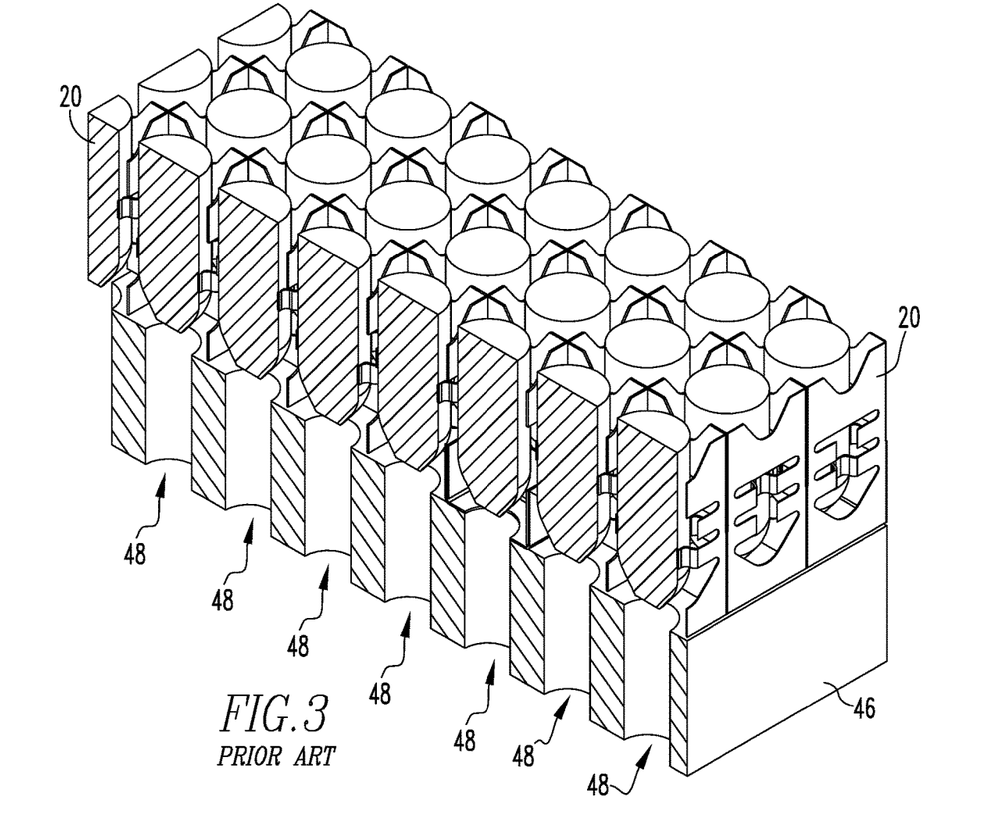
FIG. 3 is a section view of a generally central portion of the debris filter bottom nozzle of FIG. 2 shown with example fuel rods (shown schematically in section) disposed on the flow plate of the bottom nozzle along with straps of a support grid disposed about the fuel rods and resting on the flow plate.

Referring now to FIG. 2, the conventional bottom nozzle 12 includes support means in the form of a plurality of corner legs 42 which extend from a generally rectangular skirt portion 44. The corner legs 42 support the fuel assembly 10 on the lower core plate 14. Bottom nozzle 12 further includes a generally rectangular planar plate 46 which is suitably attached, such as by welding, to the skirt portion 44. As seen in FIGS. 2 and 3, the conventional bottom nozzle 12 has a plate 46 with a plurality of spaced flow holes 48. The flow holes 48 are sized to "filter out" damaging-size debris. Such a design is intended to perform such filtering without appreciably affecting flow or pressure drop through the plate 46 and the fuel assembly 10.

The diameter of the flow holes 48, as shown in the partial section view of plate 46 in FIG. 3, does not allow passage of debris that is of the size typically caught in the lowermost support grids 20. If the debris is small enough to pass through these plate flow holes 48, it is likely that it will also pass through the grids 20 since the diameter of the flow holes 48 is smaller than the largest cross-sectional dimension of the unoccupied spaces through a cell of the support grid 20. Such unoccupied spaces are typically found in adjacent corners formed by the interleaved straps which compose the grid 20. By ensuring that the debris is small enough to pass through the grid spaces, the conventional debris filter bottom nozzle 12 thereby significantly reduces the potential for debris-induced fuel rod failures. However, while generally suitable for its intended purpose, the conventional debris filter bottom nozzle 12 still allows room for improvement.

Embodiments of the present invention replace the plate 46 and positioning grid 20 of the conventional debris filter bottom nozzle 12 of FIGS. 1-3 with an arrangement that results in a lower pressure drop as compared to conventional plate 46 while also improving filtering capability. Having thus described the conventional arrangement in which embodiments of the present invention improve upon, an example embodiment of an improved filtering arrangement 100 will now be described in conjunction with FIGS. 4-13 which show various representative views of the filtering arrangement 100 and portions thereof.

Figure 4:
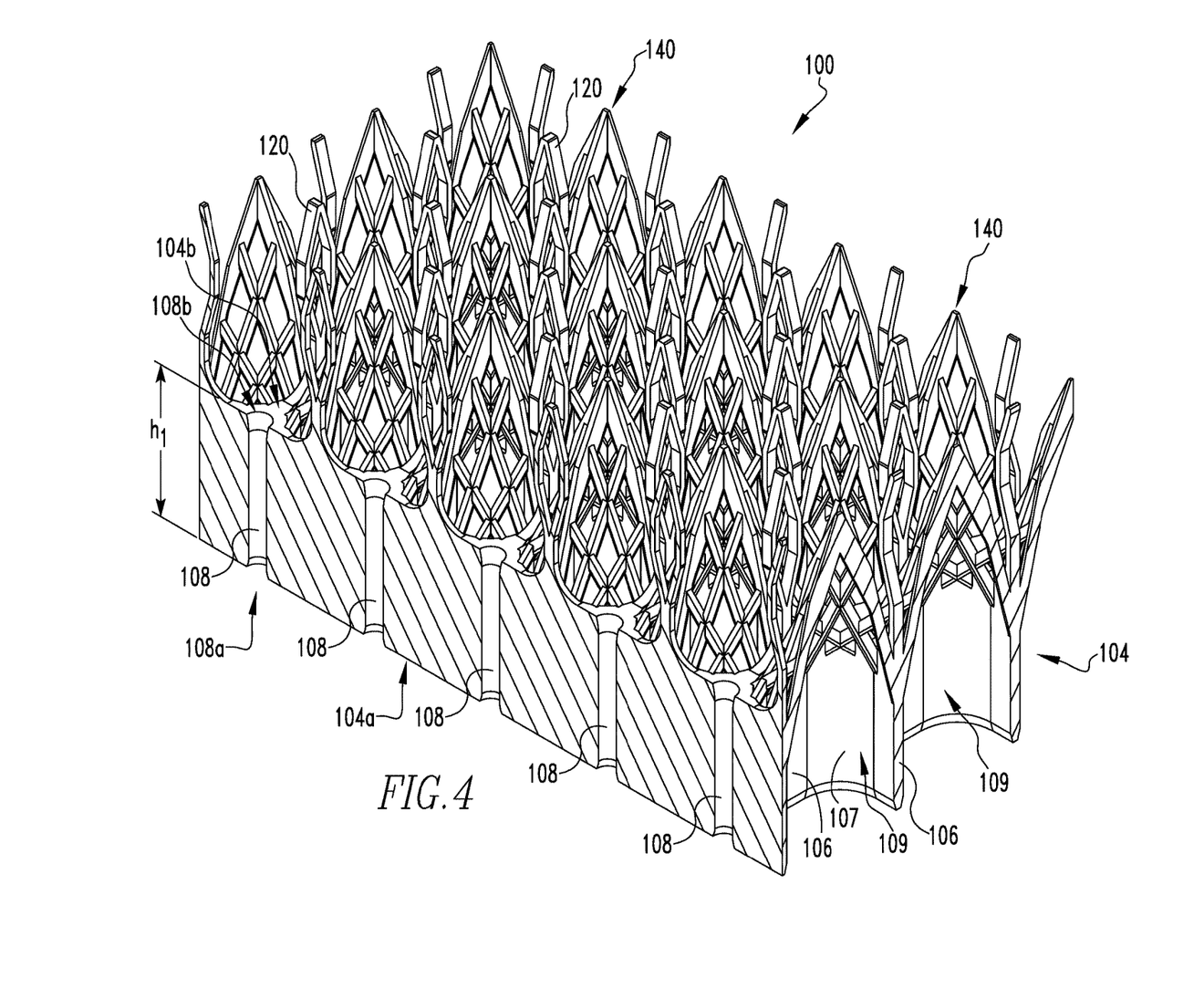
FIG. 4 is an isometric, partial section, view of a representative portion of a flow assembly in accordance with an example embodiment of the present invention.
Figure 5:
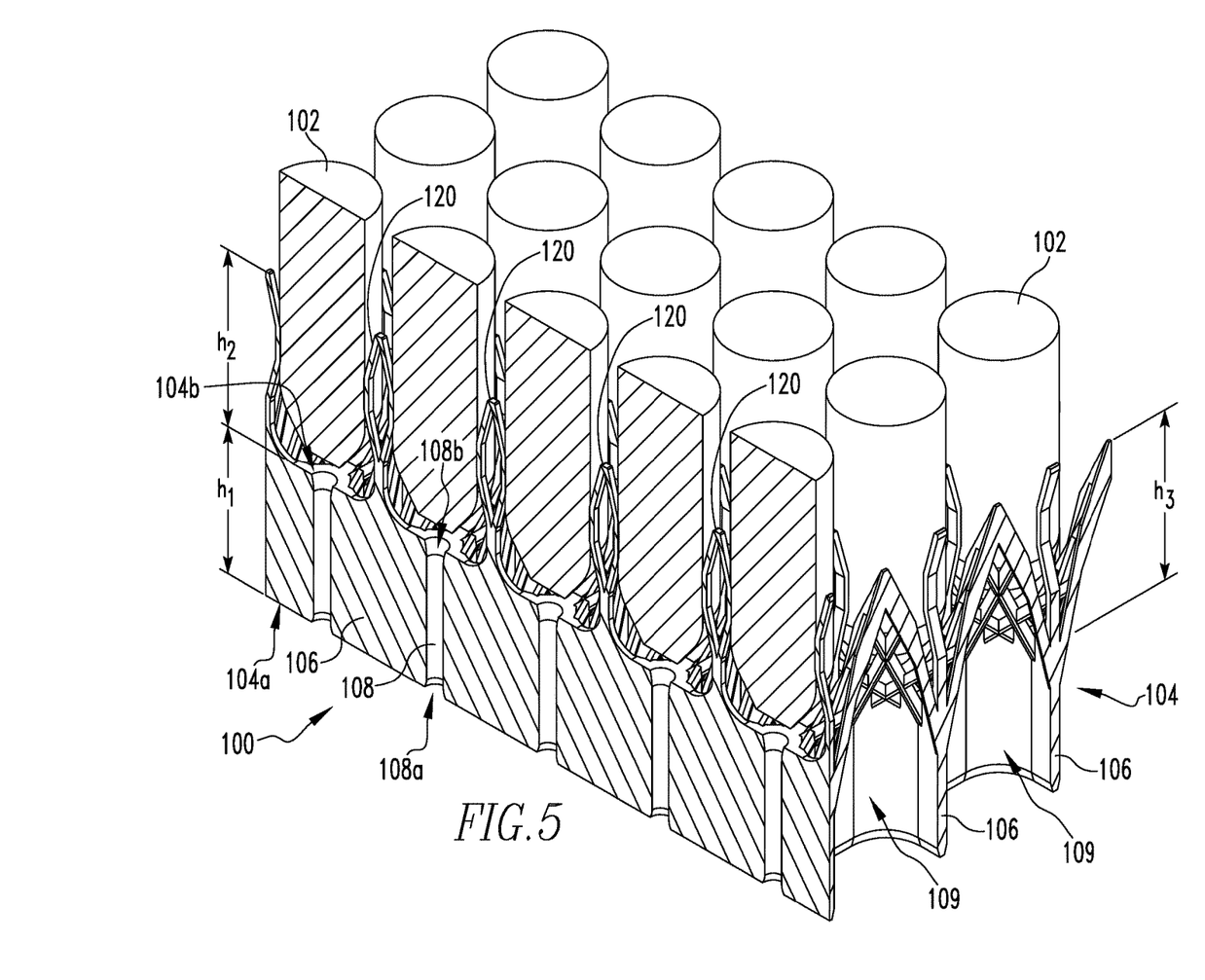
FIG. 5 is an isometric view of the portion of the flow assembly of FIG. 4 shown with end portions of example fuel rods (shown schematically, five of which are shown in section) housed therein.

Referring first to FIG. 4, an isometric, partial sectional, view of a representative portion of the example embodiment of the improved filtering arrangement 100 is shown. FIG. 5 shows the same portion of the filtering arrangement 100 with the end portions 102 of a plurality of fuel rods (only two are numbered and five of which are shown in section to show interaction with arrangement 100) shown housed in filtering arrangement 100 as would occur when arrangement 100 is employed in a fuel assembly such as previously described in conjunction with FIG. 1.

Figure 6:
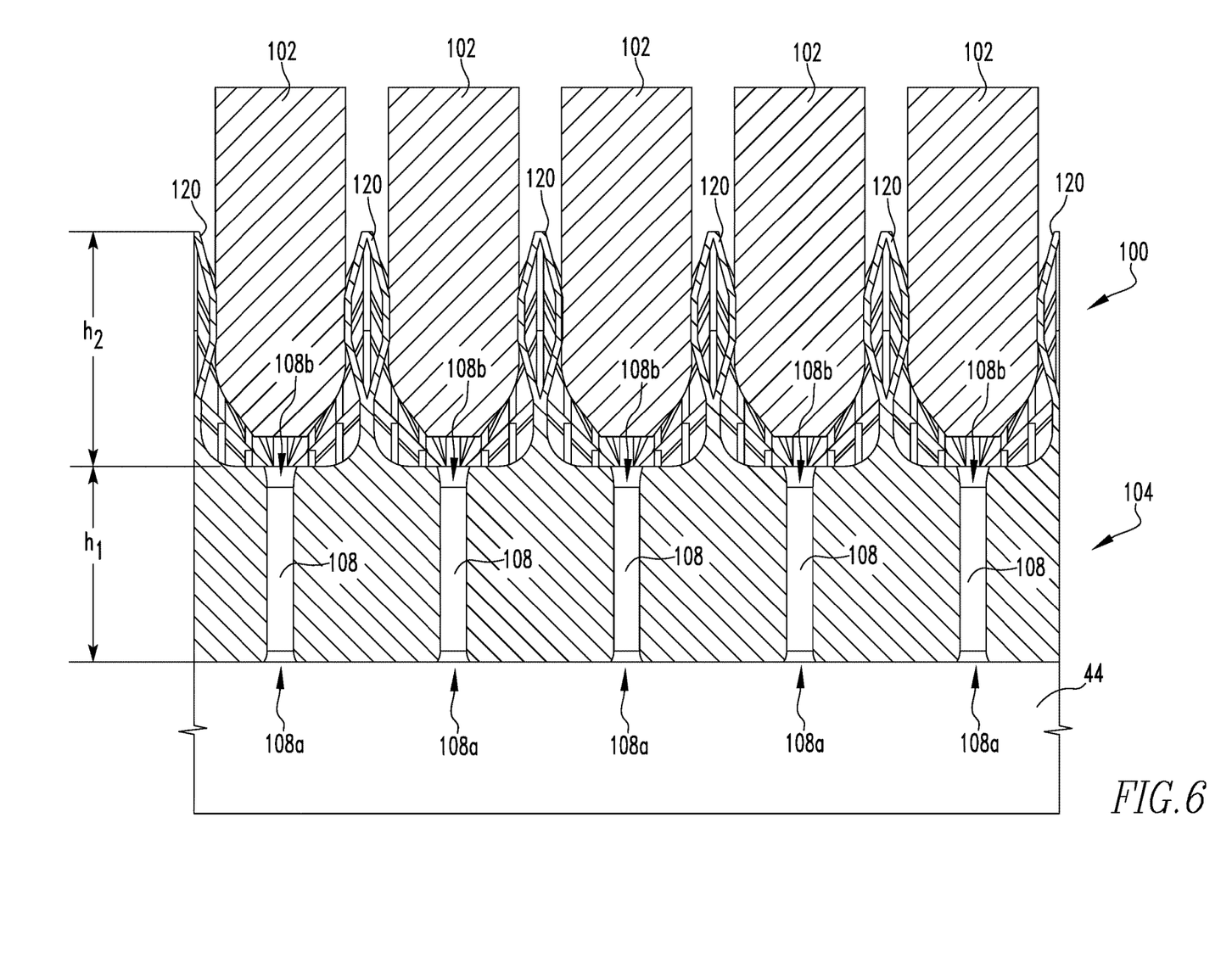
FIG. 6 is an elevational front view of the section portion of the flow assembly of FIG. 5.

Referring now to FIG. 6, in addition to FIGS. 4 and 5, arrangement 100 includes a generally planar base portion 104 which in use is structured to be coupled to a skirt portion, such as skirt portion 44 (previously discussed in regard to FIGS. 1-3 and shown schematically in FIG. 6), via welding or other suitable mechanism or mechanisms. The base portion 104 includes a bottom surface 104a, a top surface 104b, and a plurality of vertical wall portions 106 which extend a height $h_1$ between bottom surface 104a and top surface 104b. As perhaps best shown in the bottom view of the arrangement 100 shown in FIG. 8, the wall portions 106 are arranged generally in a generally squared grid-like pattern which defines a plurality of non-circular passages 109 extending from bottom surface 104a to top surface 104b through base portion 104. The areas 107 of the grid-like pattern where wall portions 106 intersect are generally slightly thickened to provide for the formation of venturi flow holes 108 (e.g., without limitation, having a diameter in the range of about 0.020" to about 0.200") which extend vertically through base portion 104 and are each positioned to be centered under the end portions 102 of a corresponding fuel rod. As used herein, "grid-like" shall be used to refer to an arrangement of elements which are laid out in a manner which is similar to a pattern of a grid. Each of the venturi flow holes 108 includes a tapered inlet (108a) and outlet (108b) so as to minimize undesirable turbulence and/or pressure drop of fluid passing therethrough. It is to be appreciated that the general arrangement of the base portion 104 provides for a rigid base while minimizing the area of the coolant flow potentially impeded thereby, as perhaps best shown in the bottom view of FIG. 8.

Figure 7:
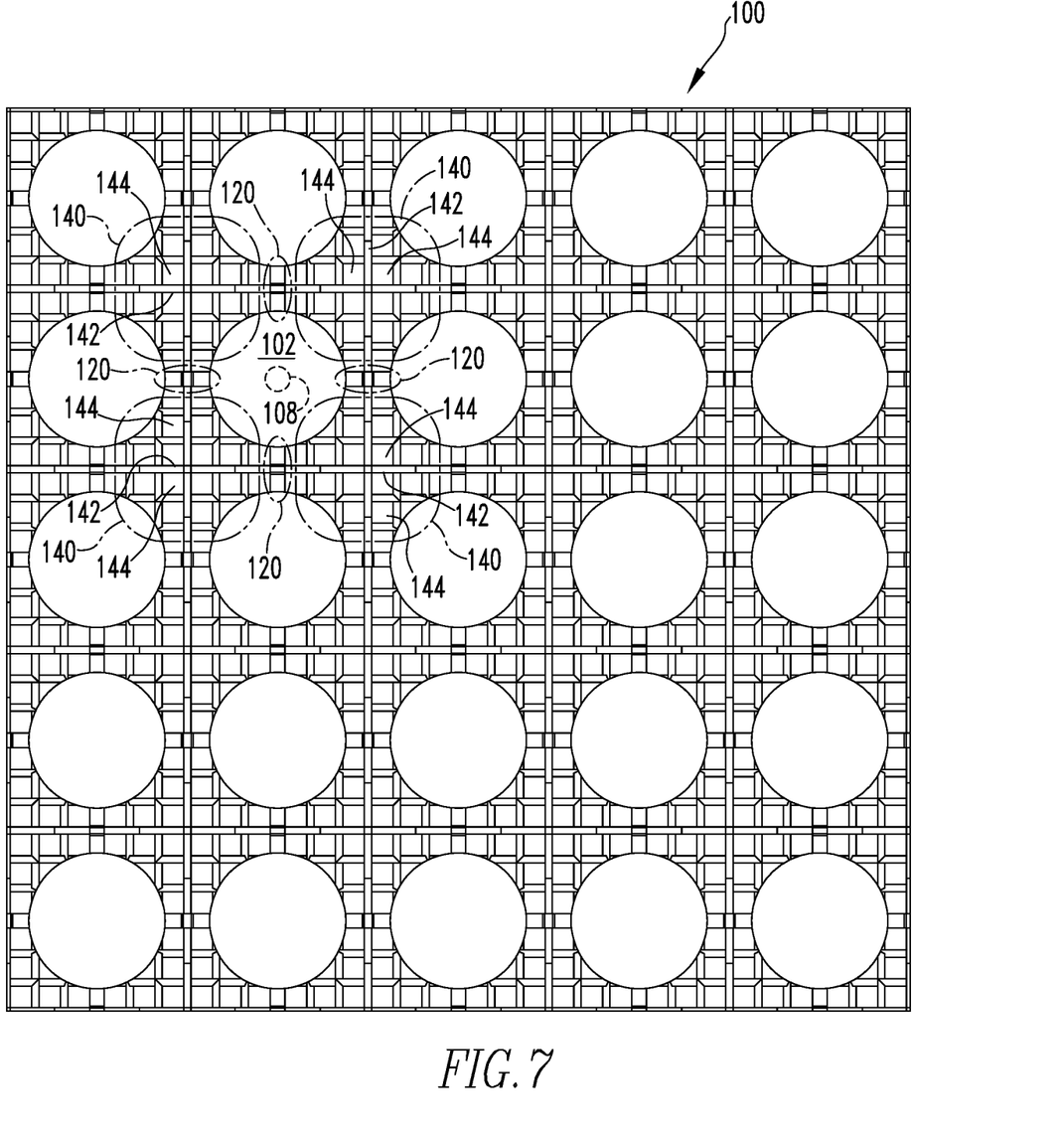
FIG. 7 is a top view of a larger portion of the flow assembly of FIGS. 4-6 shown with fuel rods (shown schematically) housed thereon for exemplary purposes.
Figure 8:
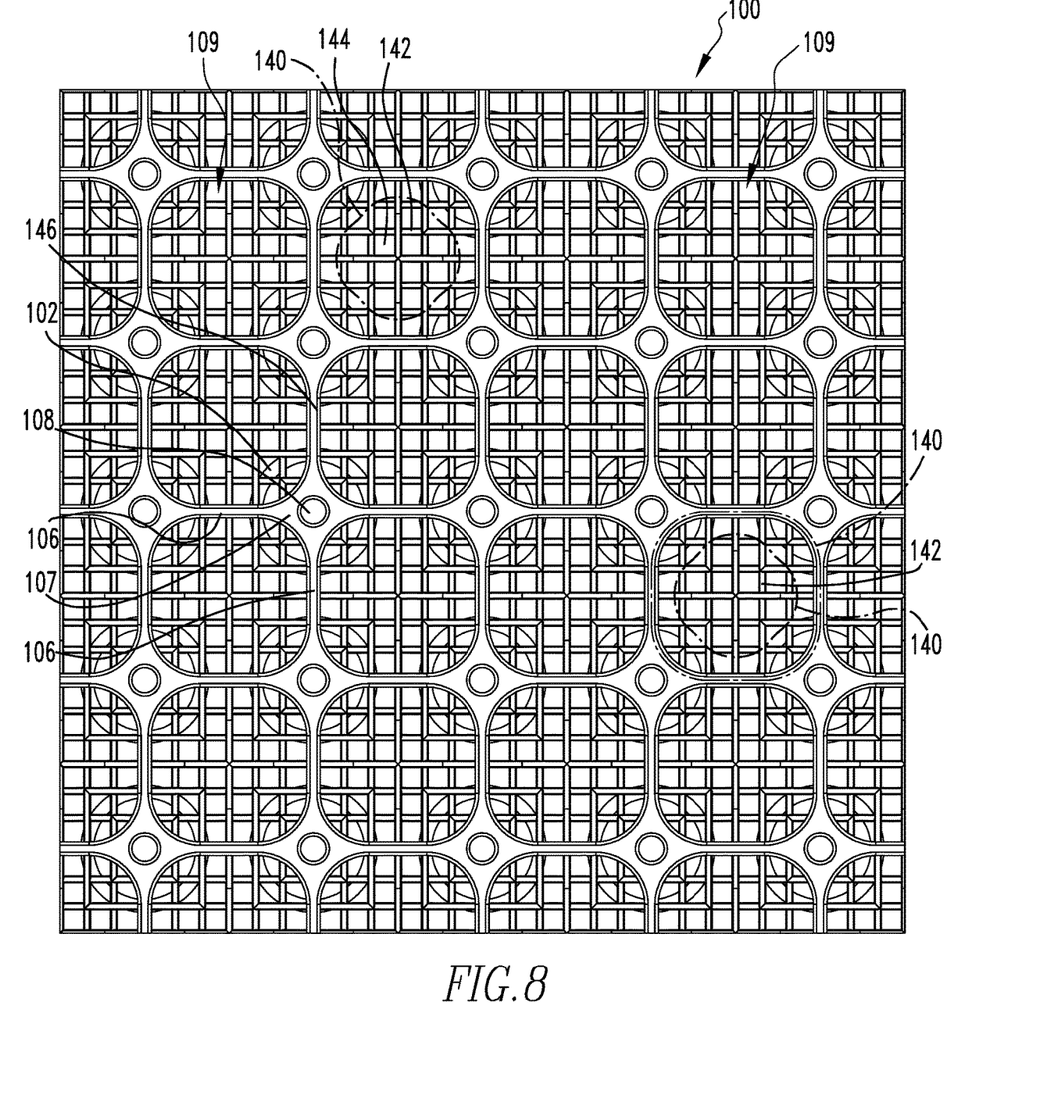
FIG. 8 is a bottom view of the flow assembly of FIG. 7 shown with the end portions of example fuel rods (shown schematically) housed in the assembly.
Figure 9:
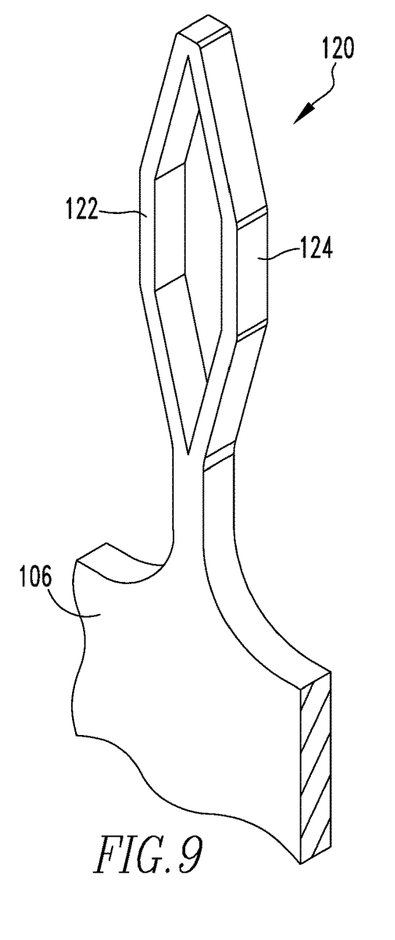
FIG. 9 is an isometric view of a vertical spring member of the flow assembly of FIGS. 4-8.
Figure 10:
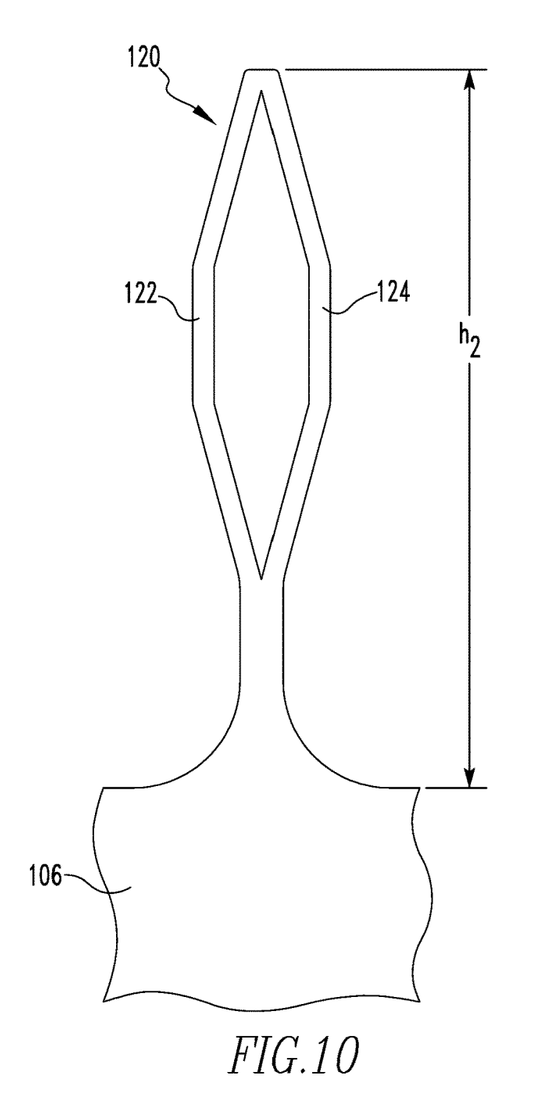
FIG. 10 is an elevational view of the spring member of FIG. 9.
Figure 11:
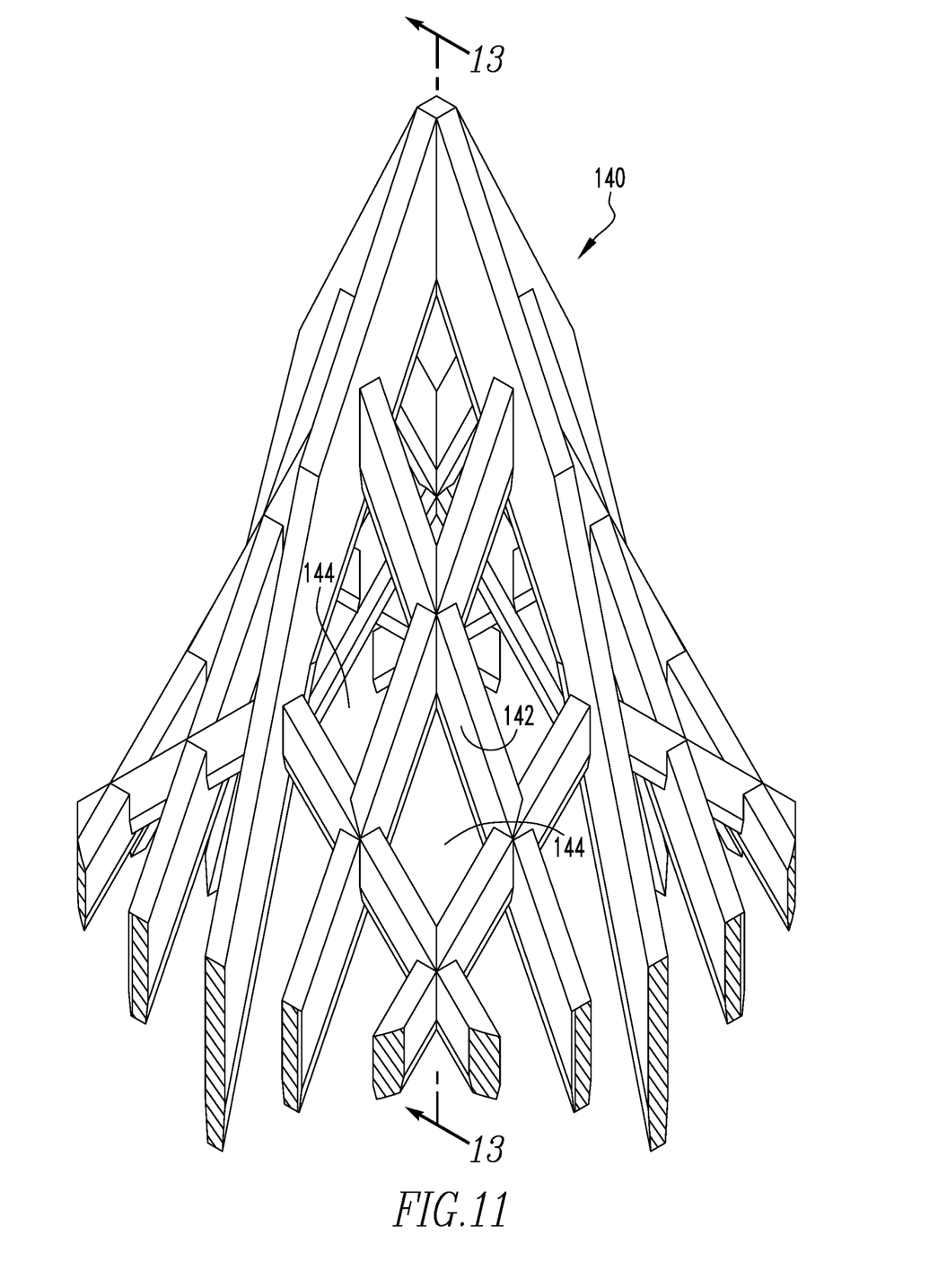
FIG. 11 is an isometric view of a debris filtering portion of the flow assembly of FIGS. 4-8.
Figure 12:
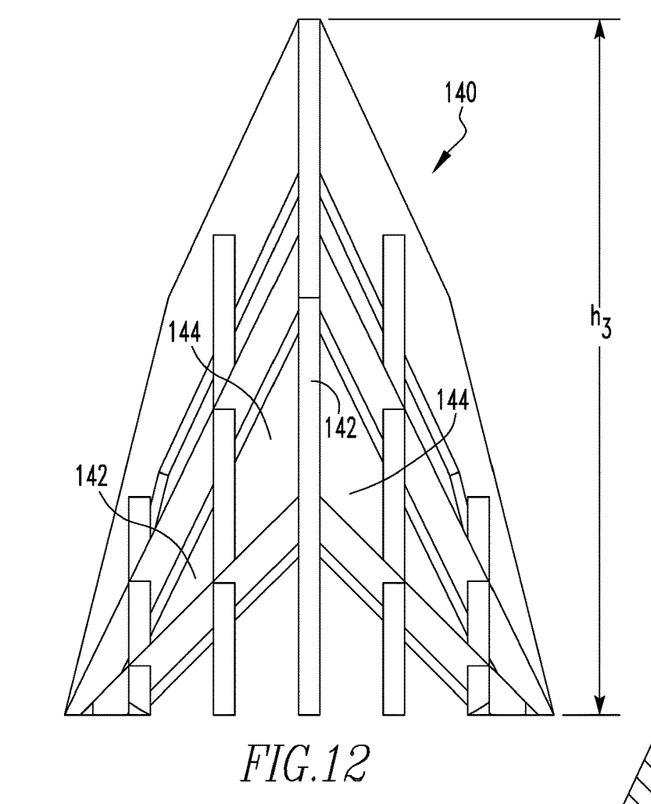
FIG. 12 is an elevational view of the debris filtering portion of FIG. 11.
Figure 13:
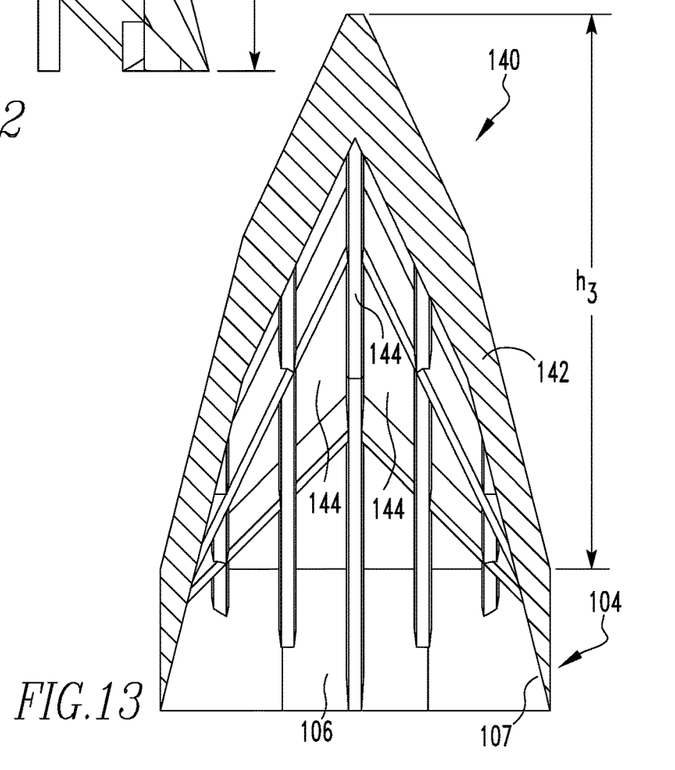
FIG. 13 is a sectional view of the debris filtering portion of FIGS. 11 and 12 taken along line 13-13 of FIG. 11.

Continuing to refer to FIGS. 4-6, and additionally to FIGS. 7, 9 and 10, assembly 100 further includes a plurality of spring members 120 which extend upward a height $h_2$ from the top edge of the wall portions 106 of the base portion 104. In example embodiments of the present concept heights $h_2$ in the range of about 0.350" to about 1.350" have been employed, although other heights may be employed without varying from the scope of the present concept. Referring to FIGS. 9 and 10, each spring member 120 includes a first spring-like biasing portion 122 and a second spring like biasing portion 124 disposed opposite the first portion 122. Each of the portions 122 and 124 are of generally arcuate shape and are positioned and structured to engage a respective fuel rod disposed on arrangement 100 in a manner which slightly grips the fuel rod. As shown in FIGS. 5-7, spring members 120 are positioned on base portion 104 in a manner such that four spring members 120 are disposed about each fuel rod 102 at 90 degree increments about each rod 102, such that each rod 102 is generally slightly pressured by two pairs of opposing spring members 120. It is to be appreciated that such an arrangement negates the need for use of a positioning grid 20 (or other positioning element) such as previously discussed in regard to FIGS. 1 and 3.

Referring now to FIGS. 4, 7, 8 and 11-13, assembly 100 further includes a plurality of debris filters 140 which are each positioned on the base portion 104 to generally span across each passage 109 between wall portions 106. Each debris filter 140 is formed generally as a hollow pyramid or hollow cone-like structure which is formed from a lattice structure 142 which is sized and configured to minimize resistance in regard to coolant flow through it, and thus minimize pressure drop, while also prohibiting debris larger than a predetermined size (e.g., without limitation, in the range of from about 0.040" to 0.100") from passing through a plurality of apertures 144 defined by lattice structure 142. In example embodiments of the present concept, lattice structures having a width in the range of about 0.005" to about 0.075" and thickness in the range of about 0.010" to 0.100" have been employed although lattice structures of other dimensions may be employed without varying from the scope of the present concept.

Each debris filter 140 extends upward a height $h_3$ upward from the base portion 104. In example embodiments of the present concept debris filters having a height $h_3$ in the range of about 0.250" to about 0.125" have been employed, although other heights may be employed without varying from the scope of the present concept. Accordingly, when viewed in the top view of the assembly 100 shown in FIG. 7, each debris filter 140 (only four of which are generally labeled in FIG. 7) extends outward from the FIG. (i.e., upward from the plane of the page). Conversely, when viewed in the bottom view of the assembly 100 shown in FIG. 8, each debris filter 140 (only two of which are generally labeled in the FIG.) extends into the plane of the page. As can be appreciated from the top and bottom views of FIGS. 7 and 8, the lattice structures 142 which form the debris filters 140 are formed so as to form a squared grid-like pattern when viewed in a direction parallel to the general flow of coolant through the assembly 100. In example embodiments of the present concept, grid dimensions in the range of from about 0.250"×0.250" to about 1.000"×1.000" have been employed, however other sizes may be employed without varying from the scope of the present concept. It is to be appreciated that such grid-like pattern is not planar, but instead is "distorted" in a three-dimensional manner so as to not be disposed in a single plane.

Example embodiments of the invention have been produced via additive manufacturing processes. Accordingly, some or all of base portion 104, spring members 120, and debris filters 140 may be formed as a single unitary element. In an example embodiment, direct metal laser melting has been employed to form embodiments of the invention from Inconel® material. It is to be appreciated, however, that other suitable methods and/or materials may be employed without varying from the scope of the invention.

Accordingly, it is to be appreciated that the invention presented herein is a completely new and novel design which incorporates a streamlined flow design which maximizes the flow area in the main body/support structure of the bottom nozzle while incorporating debris capturing fine mesh spire features which are "outside" of the main body/support structure of the bottom nozzle. Such arrangements allow for an effective debris capturing feature without adversely impacting the pressure drop which is primarily driven by the small flow holes in current bottom nozzle designs. In addition, this advanced bottom nozzle design also has a built-in feature for holding the bottom end of the fuel rod(s). In many existing fuel designs, this functionality is performed by a grid which is strategically placed just above the bottom nozzle for the purposes of capturing debris as well as holding the end of the rods. With the advanced fine mesh spire debris filtering bottom nozzle design, the additive manufacturing process allows for each of the desired bottom nozzle design features; debris capture, low pressure drop and fuel rod fixturing to all be integrated into one advanced bottom nozzle design which could not be easily achieved using existing conventional manufacturing processes. Thus, the advanced fine mesh spire debris filtering bottom nozzle design is a completely new and novel design for use in the nuclear fuel design.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A base portion for use in a bottom nozzle of a fuel assembly in a nuclear reactor, the base portion comprising:
   a top surface;
   a bottom surface;
   a plurality of vertical walls extending between the bottom surface and the top surface, wherein the plurality of vertical walls define a plurality of non-circular passages passing between the bottom surface and the top surface through the base portion; and
   a plurality of debris filters extending from the top surface and spanning across a respective one of the plurality of non-circular passages, wherein each debris filter comprises a lattice structure, and wherein the plurality of debris filters are configured to extend alongside a substantial portion of a bottom of a plurality of fuel rods of the fuel assembly and in between the plurality of fuel rods of the fuel assembly.

2. The base portion of claim 1, further comprising:
   a plurality of thickened areas, wherein each thickened area is defined by intersecting portions of the vertical walls, wherein a thickness of the intersecting portions is greater than a thickness of the vertical walls; and
   a plurality of flow holes, each disposed in a respective thickened area.

3. The base portion of claim 2, wherein each flow hole comprises a tapered inlet at the bottom surface of the base portion and a tapered outlet at the top surface of the base portion.

4. The base portion of claim 3, further comprising a plurality of spring members, each spring member extending upward from a top edge of a respective vertical wall a height, wherein each spring member is structured to be engaged by two fuel rods of the fuel assembly.

5. The base portion of claim 4, wherein each spring member includes a first biasing portion which is structured to engage one of the two fuel rods and a second biasing portion which is disposed opposite the first biasing portion and which is structured to engage a second one of the two fuel rods.

6. The base portion of claim 5, wherein each of the first biasing portion and the second biasing portion are an arcuate shape.

7. The base portion of claim 1, wherein each debris filter comprises a hollow pyramid or hollow cone structure.

8. The base portion of claim 1, wherein when viewed from directly above the base portion or directly below the base portion the lattice structure of each debris filter is arranged so as to form a pattern.

9. The base portion of claim 1, further comprising a plurality of spring members, each spring member extending upward from a top edge of a respective vertical wall a height, wherein each spring member is structured to be engaged by two fuel rods of the fuel assembly.

10. The base portion of claim 9, wherein each spring member includes a first biasing portion which is structured to engage one of the two fuel rods and a second biasing portion which is disposed opposite the first biasing portion and which is structured to engage a second one of the two fuel rods.

11. The base portion of claim 10, wherein each of the first biasing portion and the second biasing portion are an arcuate shape.

12. The base portion of claim 4, wherein the plurality of spring members are integrally connected with a respective top edge of the respective vertical wall.

13. The base portion of claim 1, wherein the plurality of debris filters are integrally connected with the top surface.

14. The base portion of claim 9, wherein the plurality of debris filters are integrally connected with the top surface and the plurality of spring members are integrally connected with a respective top edge of the respective vertical wall.

15. A bottom nozzle assembly for use in a fuel assembly in a nuclear reactor, the bottom nozzle assembly comprising:
   a rectangular skirt portion; and
   a base portion as recited in claim 1 coupled to the rectangular skirt portion.

16. A fuel assembly for use in a nuclear reactor, the fuel assembly comprising:
   the bottom nozzle assembly of claim 15;

a top nozzle;
a number of guide tubes which extend longitudinally between, and are coupled to, the bottom nozzle assembly and the top nozzle; and
an array of elongated fuel rods extending between the top nozzle and the bottom nozzle assembly.

* * * * *